UNITED STATES PATENT OFFICE.

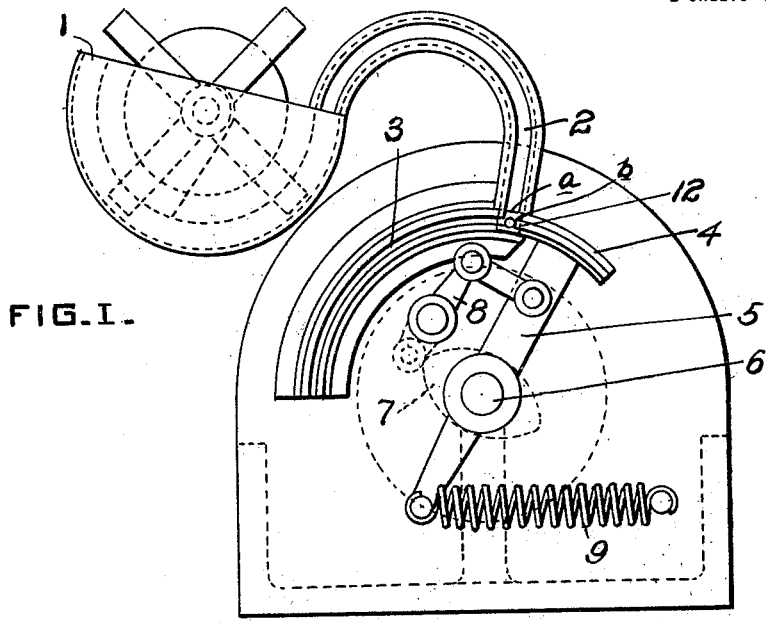
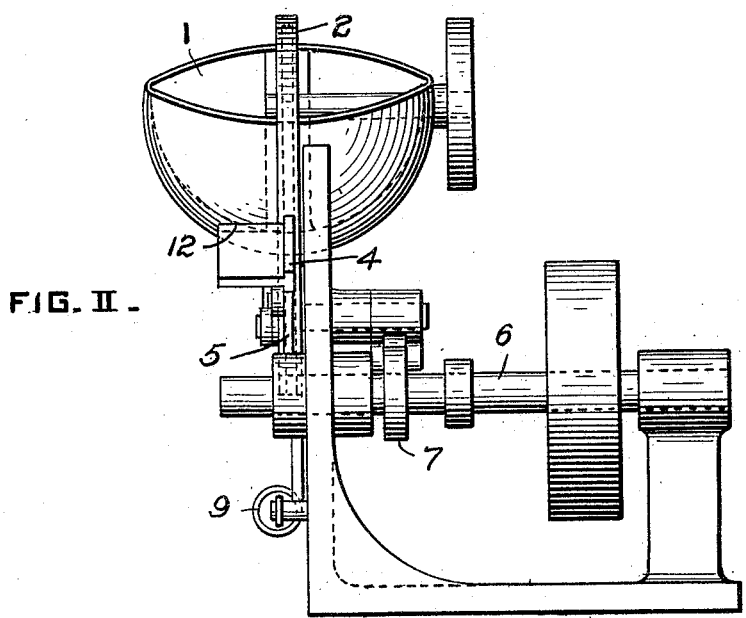

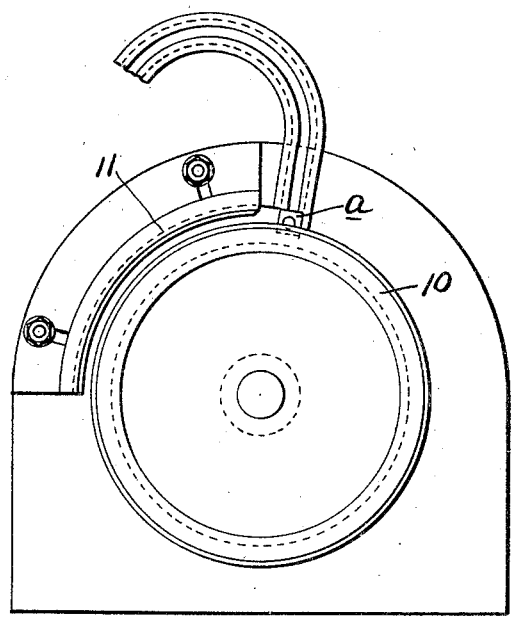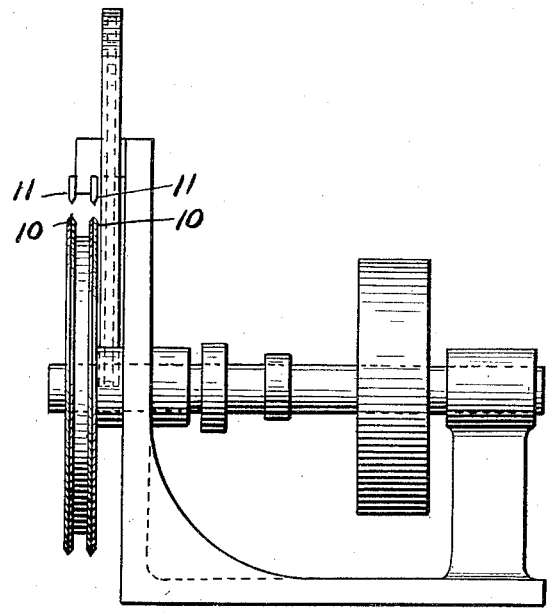

JAMES CRAIG AND CHARLES C. THOMSON, OF BUTLER, PENNSYLVANIA.

NUT AND BOLT ASSEMBLING MACHINE.

1,375,829.     Specification of Letters Patent.     Patented Apr. 26, 1921.

Application filed May 19, 1920. Serial No. 382,650.

*To all whom it may concern:*

Be it known that we, JAMES CRAIG and CHARLES C. THOMSON, residing at Butler, in the county of Butler and State of Pennsylvania, both citizens of the United States, have invented or discovered certain new and useful Improvements in Nut and Bolt Assembling Machines, of which improvements the following is a specification.

Our invention relates to improvements in machines for applying nuts to bolts; its objects are simplicity, accuracy, and durability.

The machine is illustrated in the accompanying drawings. Figure I is a view of the machine in side elevation, the bolt-handling members being, for purposes of illustration, removed; Fig. II is a view in end elevation of the machine in the same condition; Figs. III and IV are corresponding views of the machine, with the bolt-handling members in place but certain of the nut-handling members (again for simplicity of illustration) omitted.

Referring first to Figs. I and II, from a suitable hopper 1 or other place of supply, the nuts to be applied advance along a slideway 2. Means of propulsion of the nuts are indicated in the drawings, but with these our present invention is not directly concerned. Slideway 2 communicates with a slideway 3 which subtends it transversely. A single nut *a* is shown in position at the point of intersection of the two slideways. The particular disposition of the slideway 3 is not essential; in this instance it conveniently takes the arc shape, best shown in Fig. I. A reciprocating pusher 4 is provided, which, entering slideway 3 at one end, engages the nuts as they advance one by one from slideway 2. The pusher serves a double purpose: When it advances it cuts off slideway 2 temporarily, to prevent the advance of another nut, and it pushes along slideway 3 the nut which it has already engaged. The pusher will accordingly be longitudinally extended, and its length will be as great as the range of its normal movement. Furthermore, it will move in a path coincident with slideway 3; and, since that slideway is conveniently arc-shaped, the pusher 4 will conveniently be pivoted on a bearing concentric with the slideway. The drawings show an arm 5 pivoted on shaft 6 and carrying pusher 4, and a cam 7 keyed to shaft 6. The pusher is reciprocated in one direction (retracted) by the rotation of the shaft through the action of cam 7 upon a swinging lever 8 with which arm 5 is linked, and it is reciprocated in opposite direction (to push forward a nut through slideway 3) by the tension of a spring 9. The slideway 3, furthermore, is shaped to hold the advancing nut against rotation. For reasons which presently will be explained, pusher 4 need not and preferably does not reciprocate through more than a portion of the length of slideway 3.

By the instrumentalities thus far described, it will be apparent that a succession of nuts descending by gravity through the terminal portion of slideway 2 will, as the machine operates—that is to say, as shaft 6 turns—be pushed one by one along slideway 3, to the remote end of the range of reciprocation of pusher 4.

Turning now to Figs. III and IV, it is to be observed that the nut-impelling means already described are overlain by means for impelling bolts one by one and for applying them to the nuts. These means in preferred form consist essentially of two pairs of plates movable, the one pair relatively to the other, and spaced apart at an interval such as to receive the shanks of the bolts to be dealt with. The plates of one pair are movable relatively to the other, and by such movement carry forward one by one the bolts introduced between, and rotate them at the same time. Correspondence in position and adjustment in speed between movable plates and the pusher for the nuts, already considered, brings about an advance of both nut and bolt together and a rotation of the bolt, such as to cause it, (the threads making engagement) to advance longitudinally within the nut, so that at the end of this operation bolt and nut are discharged from the machine with nut assembled on bolt. The particular arrangement is preferably that shown in the drawings.

Mounted for rotation on an axis coincident with the axis of turning of pusher 4 is a pair of disks 10. These disks 10 are thin-edged; as shown they are separated at an interval one from another, and are adjustable in their spacing. Opposite the peripheries of disks 10 and extending throughout a portion of the peripheries is a corresponding pair of arc-shaped plates 11, also thin-edged, adjustable in their position, relatively to disks 10 and adjustable also in their spacing one from another. The center of curvature of the arc to which the edges of these plates are shaped is (with such minor departure as is involved in the adjustment mentioned) the center of turning of disks 10. The disks 10 and plates 11 are thin-edged, to enter the threads of a bolt introduced between; they are adjustable, the plates relatively to the disks, to accommodate bolts of different thickness, and pair by pair, the disks and the plates are adjustable in their spacing disk from disk and plate from plate, to accommodate bolts having threads cut to different scales. This does not mean that every new pitch requires a new setting of disks and of plates. For instance, if the bolts to be dealt with are threaded, all of them, to the U. S. scale, and if the disks be spaced apart and the plates also be spaced apart at an interval of one inch, every bolt will be received and dealt with properly, whether the pitch be 10 to the inch or 20, or any other to the same scale.

It remains to be noted that pusher 4 is provided with an extension 12 (cf. Figs. I and II) which, when in place, overlies the peripheries of disks 10 and extends sufficiently to be effective to push sidewise a bolt lain across the edges of disks 10. The portion of pusher 4 which bears on the nut and the portion which bears on the shank of a bolt are properly related to advance nut and bolt together when brought to axial alinement. This best appears in Fig. I, where a nut is indicated at $a$ and a bolt at $b$. It is to be noted also that plates 11 are conveniently so arranged that there is a space through which nut and bolt are pushed before the advancing bolt is engaged by the edges of plates 11, and, so engaged, begins to revolve.

The operation will readily be understood. The parts constructed and arranged as has been described, the action of the nut-feeding mechanism furnishes a succession of nuts descending through slideway 2, ready to be taken up and advanced one by one. As shaft 6 turns, arm 5 oscillates, and in its oscillation advances the nuts one by one along slideway 3. On each retraction of pusher 4 the attendant deposits a bolt upon the edges of disks 10, opposite a nut standing in the position indicated at $a$, Fig. I. The threaded portion of the shank of the bolt rests on the disks, and the thin edges of the disks enter the threads. With nut and bolt so relatively placed, pusher 4 advances, and carries them together sidewise. Meantime, it will be understood disks 10 are rotating, and the rotation tends to carry the bolt forward and also to rotate it on its axis. The speed of advance of pusher 4 is, however, preferably half that of the periphery of disks 10. In the particular machine shown the swing of arms 5 is through a narrow arc,— 45°, more or less—and the arm swings twice with each rotation of shaft 6 and of disks 10.

As bolt and nut advance in alinement and in juxtaposition, as described, the plates 11 engage the shank of the bolt; the edges of the plates enter the threads; and then the continued rotation of disks 10 effects a positive frictional rotation, a rolling of the bolts between disks and plates, with the effect that the shanks of the bolts are screwed into the nuts. As this operation progresses the bolts move longitudinally toward the nuts. The range of pusher movement is sufficient to bring the bolts under the certain turning influence of the coöperating disks and plates. The pusher duty is then fulfilled, and the pusher may return to its initial position. During the further operation the nut is carried forward in consequence of its engagement by the bolt. The coöperating edges of disks and plates 10 and 11 are sufficiently extended to effect the turning of bolt within nut to the desired degree.

The circular arrangement shown is of no greater significance than that it is convenient; the turning of the bolt conveniently begins, it will be noted (Fig. III), at the highest point of the rims of the disks 10; the extent of the plates 11 is through a quadrant; the direction of turning is, for obvious reasons, anti-clockwise.

Modification in detail has been alluded to; the showing of the drawings is exemplary; the following claims define what is essential; beyond that, the invention admits of such variation in mechanical details, as the engineer may prefer or find desirable.

We claim as our invention:

1. In a nut and bolt assembling machine, a roll way for bolts formed by and between opposite bolt-engaging members extending in parallelism, means for moving one of said members relatively to the other in the line of such parallelism, whereby a bolt engaged by the said opposite members is rolled in said roll way, and means for causing a nut restrained against rotation to advance in unison with a bolt so rolled, substantially as described.

2. In a nut and bolt assembling machine, a roll way for bolts formed by and between opposite bolt-engaging members, one of said members being adapted to enter the thread formed upon the shank of the bolt, means for moving one of said members relatively to the other, whereby a bolt engaged by said opposite members is rolled in said roll way, and, by virtue of engagement of one of said members with its threaded shank, is caused to advance longitudinally as it rolls, together with means for causing a nut while restrained against rotation to advance in unison with such rolling bolt, substantially as described.

3. In a nut and bolt assembling machine, the combination of a slideway for a nut, an adjacent roll-way for a bolt, and a pusher advancing through a portion of the extent of slideway and roll-way, substantially as described.

4. In a nut and bolt assembling machine, the combination of a slideway for nuts and a roll-way for bolts, said roll-way consisting of two pairs of oppositely placed knife-edged plates, and means for moving the plates of one of said pairs relatively to the other, substantially as described.

5. In a nut and bolt assembling machine, the combination of a slideway for nuts and a roll-way for bolts, said roll-way consisting of two pairs of oppositely placed knife-edged plates, the plates of each pair being adjustable in their spacing one from another, and means for moving the plates of one of said pairs relatively to the other, substantially as described.

6. In a nut and bolt assembling machine, the combination of a slideway for nuts and a roll-way for bolts, said roll-way consisting of two pairs of oppositely placed knife-edged plates, the pairs being adjustable in their spacing, pair from pair, and means for moving the plates of one of said pairs relatively to the other, substantially as described.

7. In a nut and bolt assembling machine, the combination of a slideway for a nut and an adjacent roll-way for a bolt, and means for rolling a bolt along said roll-way, substantially as described.

8. In a nut and bolt assembling machine, the combination of a rotatable shaft, a bolt-rolling disk mounted on said shaft, a bolt-engaging plate arranged opposite the edge of said disk and forming with the disk a bolt roll-way, a slideway for a nut arranged adjacent the said roll-way, an arm pivoted on said shaft, means for effecting periodic oscillation of said arm as the shaft rotates, and a pusher carried by said arm, substantially as described.

9. In a nut and bolt assembling machine the combination of an essentially cylindrical support mounted for rotation upon a horizontal axis, by virtue of which arrangement a bolt laid upon its upper rim may rest thereon by gravity, said support being provided with a knife edge adapted to enter the thread upon the shank of a bolt laid thereon, a curved wall spaced at an interval from the rim of said support parallel therewith and forming therewith a way wherein a bolt laid upon said support will roll as said support rotates, together with means for causing a nut restrained against rotation to advance in unison with a bolt advancing in such way, substantially as described.

In testimony whereof we have hereunto set our hands.

JAMES CRAIG.
CHARLES C. THOMSON.

Witnesses:
CHARLES FLUCHBARTH,
WALTER W. SMITH.